US008285702B2

(12) United States Patent
Carmel et al.

(10) Patent No.: US 8,285,702 B2
(45) Date of Patent: *Oct. 9, 2012

(54) CONTENT ANALYSIS SIMULATOR FOR IMPROVING SITE FINDABILITY IN INFORMATION RETRIEVAL SYSTEMS

(75) Inventors: David Carmel, Haifa (IL); Elad Yom-Tov, Hamovil (IL); Naama Zwerdling, Pardes Hana (IL)

(73) Assignee: International Business Machines Corporation, Armonk, NY (US)

( * ) Notice: Subject to any disclaimer, the term of this patent is extended or adjusted under 35 U.S.C. 154(b) by 378 days.

This patent is subject to a terminal disclaimer.

(21) Appl. No.: 12/188,013

(22) Filed: Aug. 7, 2008

(65) Prior Publication Data
US 2010/0036828 A1 Feb. 11, 2010

(51) Int. Cl.
*G06F 17/30* (2006.01)
(52) U.S. Cl. ........ 707/709; 707/706; 707/707; 707/723; 707/748
(58) Field of Classification Search .............. 706/45–50; 705/14.49; 707/705–711, 722, 723–728, 707/730, 741–743, 748–750, 755; 709/203
See application file for complete search history.

(56) References Cited

U.S. PATENT DOCUMENTS

| | | | |
|---|---|---|---|
| 6,799,214 B1 * | 9/2004 | Li ................................. | 709/226 |
| 7,551,388 B2 * | 6/2009 | Horiguchi et al. .............. | 360/75 |
| 7,792,830 B2 * | 9/2010 | Carmel et al. ................. | 707/728 |
| 2003/0046389 A1 | 3/2003 | Thieme | |
| 2005/0246321 A1 * | 11/2005 | Mahadevan et al. ............ | 707/3 |
| 2006/0036588 A1 * | 2/2006 | Frank et al. ..................... | 707/3 |
| 2006/0085395 A1 * | 4/2006 | Cradick et al. ................. | 707/3 |
| 2006/0212441 A1 * | 9/2006 | Tang et al. ...................... | 707/5 |
| 2006/0218146 A1 * | 9/2006 | Bitan et al. ..................... | 707/7 |

(Continued)

FOREIGN PATENT DOCUMENTS

| | | | |
|---|---|---|---|
| JP | 2001319129 | | 11/2001 |
| WO | WO 2004012049 | * | 2/2004 |
| WO | WO 2007056031 | * | 5/2007 |
| WO | WO 2007/143395 | | 12/2007 |

OTHER PUBLICATIONS

Ali Mohammad et al. "DistanceRank: An intelligent ranking algorithm for web pages",Information Processing and Management 44 (2008) 877-892.*

(Continued)

*Primary Examiner* — Srirama Channavajjala
(74) *Attorney, Agent, or Firm* — Scully, Scott, Murphy & Presser, P.C.; Suzanne Erez, Esq.

(57) ABSTRACT

A system and method including a simulator operating in conjunction with a search-engine, for improving document and site findability. Users input their content (pages or sites) and the simulator will analyze the site in terms of structure and content. It will then give the user a ranked list of suggestions about how the user might improve his/her site's findability. The user will then be able to apply some or all of these suggestions, or any other changes, by virtually modifying the site, and then immediately receive feedback both on how the pages look and a sense of the degree of findability improvement. The interactive process allows users to simulate modifications in their site structure and content in order to improve its findability. When the user completes the modifications and is satisfied with the new findability of his site, the user will be able then to replace his/her current site in the repository with the modified one.

27 Claims, 7 Drawing Sheets

U.S. PATENT DOCUMENTS

| | | | |
|---|---|---|---|
| 2006/0242128 A1* | 10/2006 | Goel | 707/3 |
| 2007/0043583 A1* | 2/2007 | Davulcu et al. | 705/1 |
| 2007/0106641 A1* | 5/2007 | Chi et al. | 707/3 |
| 2007/0185861 A1* | 8/2007 | Budzik et al. | 707/5 |
| 2008/0027936 A1* | 1/2008 | Liu et al. | 707/7 |
| 2008/0033971 A1 | 2/2008 | Carmel et al. | |
| 2008/0065440 A1* | 3/2008 | Graham et al. | 705/7 |
| 2008/0155388 A1* | 6/2008 | Conway | 715/205 |
| 2008/0243632 A1* | 10/2008 | Kane et al. | 705/26 |
| 2009/0006374 A1* | 1/2009 | Kim et al. | 707/5 |
| 2010/0082637 A1* | 4/2010 | Mishne et al. | 707/748 |

OTHER PUBLICATIONS

Elaine G. Toms et al. "Measuring user perceptions of Web site reputation",Information Processing and Management 40 (2004) 291-317.*

Chi-Jen Wu et al. "Using Web-Mining for Academic Measurement and Scholar Recommendation in Expert Finding System",2011 IEEE/WIC/ACM International Conferences on Web Intelligence and Intelligent Agent Technology.*

Carmel et al., "What Makes a Query Difficult?", ACM, 2006.

* cited by examiner

Site Pages:

| ID | URL 302 | In Links 304 | Out Links 306 | Index Last Update 308 | Indexed Version Up-To-Date 310 | Title 313 | Keywords 315 | Dogear Tags 318 |
|---|---|---|---|---|---|---|---|---|
| A | http://w3haifa.ibm.com/dept/imt/ir.html | 7 | 34 | 05/08/2007 |  | IBM Haifa Labs/ | IBM Haifa Labs/ | Facet_Search(1), IR_group(1),Juru (1),Juru_XML(1), Tamnoon(1) |
| B | http://w3haifa.ibm.com/projects/imt/juru/index.html | 3 | 19 | 05/08/2007 |  | IBM Haifa Labs/ Juru-Generic Full-text Java Sea | IBM Haifa Labs/ Information and Interaction, Infor | |
| C | http://w3haifa.ibm.com/projects/imt/esearch/index.html | 2 | 18 | 05/08/2007 |  | IBM Haifa Labs/ eSearch-Self-Help by Searching | IBM Haifa Labs/ Information and Interaction, Infor | None |

FIG. 5A

Important Terms:

| | Keyword 375 | Frequency at page 385 | | | | Frequency at connection | Precision @10 |
|---|---|---|---|---|---|---|---|
| | | All | A | B | C | | |
| 1 | juru | 20 | 6 | 12 | 2 | 463 | A B C / 0 2 0 |
| 2 | esearch | 8 | 1 | 0 | 7 | 49 | A B C / 2 0 4 |
| 3 | group ir | 4 | 4 | 0 | 0 | 4 | A B C / 1 0 0 |
| 4 | full text | 6 | 2 | 4 | 0 | 92 | A B C / 0 2 0 |
| 5 | retrieval | 9 | 5 | 1 | 3 | 759 | A B C / 0 0 0 |
| 6 | lingual multi | 4 | 0 | 2 | 2 | 12 | A B C / 0 3 2 |
| 7 | help self | 5 | 2 | 1 | 2 | 89 | A B C / 0 0 0 |
| 8 | engine search | 7 | 3 | 4 | 0 | 500 | A B C / 0 0 0 |
| 9 | Information retrieval | 6 | 4 | 1 | 1 | 269 | A B C / 7 0 0 |
| 10 | lingual | 4 | 0 | 2 | 2 | 26 | A B C / 0 3 2 |

Dominant Competitors: ←⸺390

- Page:http://w3.haifa.ibm.com/projects/km/ir/juru/index.html ⸺394
  - Competing on terms: juru, lingual, multi, full text
  - Analyze Go ⸺395
  - Compare to: A▾ ⸺396

FIG. 5C

Recommendations:        400

1: Are you using relevant terms in your site?
- Make sure that the most representatives keywords of your site exists in the "Important terms" table above.
- Make sure there are no unimportant terms in the "Important terms" table above.
- Try to add representative terms and remove unrepresentative terms from your site.
- Make sure that the most representative terms will appear in title, header and bold text.

⎫ 450

2. Note: The terms below were not able to retrieve any of your site pages among top 10 documents.
  Terms:
- help self
- engine search

3: Know your competitors!
- Take a look at the list above called "Dominant Competitors".
- Clicking on the URL would take you to the competitor web site.
- Clicking on "Analyze" will analyze the findability of the competitor site.
- If your competitor's page is similar to your site-find out what other keywords can you add to your site.
- Explore the terms that were dominated by your competitors.
- Find out what which terms differentiates you from your competitor and emphasize those terms at your site.

⎬ 410

4. Some of your site's pages seem to include scripts.
- Scripts are invisible for the search engine and therefore it is recommended that valuable content would not be inside the script.
- Pages:
  - http://w3haifa.ibm.com/dept/imt/ir.html
  - http://w3haifa.ibm.com/projects/imt/juru/index.html
  - http://w3haifa.ibm.com/projects/imt/esearch/index.html

FIG. 6

CONTENT ANALYSIS SIMULATOR FOR IMPROVING SITE FINDABILITY IN INFORMATION RETRIEVAL SYSTEMS

CROSS-REFERENCE TO RELATED APPLICATIONS

The present application relates to commonly-owned, U.S. patent application Ser. No. 11/461,464 filed Aug. 1, 2006, now U.S. Pat. No. 7,792,830, the entire content and disclosure of which is incorporated by reference as if fully set forth herein.

FIELD OF THE INVENTION

The present disclosure relates generally to information retrieval systems, and more particularly, to a simulator, implemented as part of or operating in conjunction with a search-engine, for improving document and site findability.

BACKGROUND OF THE INVENTION

Content Management, also known as CM, is a set of processes and technologies supporting handling of digital information. This digital information is often referred to as digital content. Currently, people managing content have very few tools to tell them, a priori, if users will be able to locate their content.

"Findability" is the term used to refer to the quality of being locatable or the ability to be found. Findability has become highly relevant with the expansion of the World Wide Web. However, findability is not limited to the web and can equally be applied to other environments. The structure, language and writing style used for content description all have a huge effect on the "findability" of content by users searching for information encapsulated in that content.

Currently, content providers who write content for Intranet and Internet web-sites find it very difficult to make the pages they write findable by potential consumers. The main reason is the difficulty to describe their content in optimal ways from the search engine perspective. This means that while the content itself may suffice, it is written and formatted in such a way that the search engine employed to find the site, e.g., in response to a query or user input, ranks it low compared to other pages which may be of lesser interest to people who search for specific content.

Currently, the main solution to this problem is either experience of the people who generate the content or, more commonly, experts in the field of Search Engine Optimization (SEO) who reformat pages to be better valued by the search engine, based on their knowledge and experience.

However, both these approaches rely on experience rather than on objective measures. SEO experts usually do not have access to the search engine ranking methodology, hence their recommendations are mostly based on experience and common assumptions. Moreover, due to the complexity of the ranking algorithms used by state of the art search engines, it is extremely difficult to predict in advance, the effect of modifications, in content and structure, on the ranking of the web-pages pages in the set of results for specific queries.

In the patent literature, US Patent Publication No. 2003/0046389A1 describes a standard SEO system, where web site improvements are based on user behaviour in the web site. While US Patent Publication No. 2003/0046389 talks about the possibility that an Human SEO will recommend how to improve the site by discussing how SEO professionals may "advise" an owner of the Web site on how to write strategic and relevant "copy," i.e., text, for a given Web page or Web site, there is no teaching or disclosure as to how to do it automatically based on a findability analysis without human expert intervention.

Japanese patent JP2001319129A2 refers to a general system which is based on comparing the behaviour of different search engines on the same web site.

European Patent application WO/07143395A2 refers to a system which proposes improvements based on general rules (generated by an expert) that would generally benefit the performance of a web page however, not specific to any one website.

Other non-patent literature refers to the generation implementation of simple heuristics (e.g., analysis of log files, analysis of incoming links) to suggest improvements to web pages.

It would be highly desirable to provide a system and method that operates in conjunction with a search engine for automatically analyzing a web-site or web page and making recommendations for improving document (e.g., web-page) and web-site findability.

BRIEF SUMMARY OF THE INVENTION

The present invention is directed to a methodology, system and computer program product for improving document (e.g., web-page) and web-site findability.

In one aspect of the invention, there is provided a simulator operating in conjunction with a search-engine, for improving document and site findability. Users input their content (pages or sites) and the simulator will analyze the site in terms of structure and content. It will then give the user a ranked list of suggestions about how the user might improve his/her site's findability. The user will then be able to apply some or all of these suggestions, or any other changes, by virtually modifying the site (e.g., using a text editor or HTML editor), and then immediately receive feedback both on how the pages look and a sense of the degree of findability improvement. The interactive process allows users to simulate modifications in their site structure and content in order to improve its findability. When the user completes the modifications and is satisfied with the new findability of his site, the user will be able then to replace his/her current site in the repository with the modified one.

In one aspect of the invention, there is provided a computer-implemented method for improving a web-site's content comprising:

receiving a document set representing a web-site's page(s);

for each web-page, performing a meta-data extraction to obtain features of the site pages related to its findability;

determining the site's important terms from the features; and, for each important term found for this site, implementing, via the search engine, a search query using this term and, retrieving the returned results of web pages having the term;

identifying, based on the query results, the place of the current site's web page in the rank of the returned results;

providing recommendations for improving the web site based upon the web pages results ranking, the recommendations directed to improving the web-site's findability.

In a further aspect of the invention, there is provided a system for improving a web-site's content comprising:

a server device for receiving a document set representing a web-site's page(s);

a simulator device operable for receiving the document and for analyzing the document set to determine the site page's important terms;

a search engine for searching, for each important term found for this site, a search query using the site's important terms and, retrieving the returned results of web pages having the term, the search engine further identifying, based on the query results, a ranking of the current site's web page in a list of the returned results; and, the simulator device generating an interface to provide recommendations directed to improving the web-site's findability based upon the web pages results ranking.

In accordance with the system (and method), the simulator comprises:

means for performing, for each web-page, a meta-data extraction to obtain features of the site pages related to its findability, the performing means determining from the features the web-site's important terms, wherein the important terms includes the most important concepts in the web-site content, the simulator means determining, for each web-page, a set of terms from the terms of the document set that minimizes a distance measurement from the given set of documents.

Advantageously, in accordance with the principles of the invention, dominant competitors can be determined and analyzed to determine the differences between a given site's page(s) and the competitors' sites, which differences may be suitably emphasized or flagged for a user, via a client device. Such determination is valuable as the user may learn the reasons that cause their competitors to dominant a given site's page(s).

Thus, in a further aspect, the invention can be applied to obtain information about an entity's Dominant Competitors by performing a top-k dominant competitor analysis for determining any web page in the domain, not belonging to the given site, that is ranked higher than all the site pages for at least k important terms.

Further to this aspect, in accordance with the system (and method) of the invention, the simulator performs the top-k dominant competitor analysis by:

receiving a second document set representing a second web-site's page(s);

determining a ranking of the second web-site based on the second site's important terms from the features; and, performing a count of how many important terms this page is ranked higher than all the given site pages determining whether the count is greater than a threshold number k; and, if the count is greater than the threshold k, identifying the second web site count as a top-k dominant competitor.

The computer-implemented method further determines the differences between a given site's page(s) and the competitors; and, informs a user the differences, wherein the differences can be used to modify the given web-site.

In a further aspect of the invention, a service is provided that operates in conjunction with a search engine by enabling receipt of user content (e.g., a web page, or site), analyze the page or site content in terms of structure and content, and, generate a ranked list of suggestions as to how to improve the page or site's findability, i.e., improve the likelihood that the page or site will be ranked high by the search engine, if the suggestions are implemented.

Advantageously, the findability simulator permits a user to modify his/her web site pages. Those modified pages replace the original pages in the mirror index of the search engine. The simulator then analyses the findability of the modified site using the mirror index (with the new modified pages). When modification is completed the user may complete the task by saving the modified site in the main index.

Thus, via an interactive process, the simulator enables the user to modify his/her web site and simulates how these modifications affect its findability. The search engine holds a separate mirror index where the site modifications are handled. After modifications has been applied the findability analysis is invoked over the modified site. After the user is satisfied with his/her modifications and is satisfied with the new findability of the site, the new modified site will be re-indexed by the search engine, i.e., the user will be able then to replace his/her current site in the repository with the modified one.

Advantageously, a search service may be provided that includes the simulator operating in conjunction with a search-engine, for improving document and site findability.

BRIEF DESCRIPTION OF THE DRAWINGS

Further features as well as the structure and operation of various embodiments are described in detail below with reference to the accompanying drawings. In the drawings, like reference numbers indicate identical or functionally similar elements.

FIGS. 5A and 5B depict exemplary output pages of the findability simulator providing findability analysis results for a document (FIG. 5A) and providing important terms results for a document (FIG. 5B);

FIG. 5C depicts an example user interface of the findability simulator wherein, for a selected competitor web-page, a findability analysis may be conducted from which information may be determined the top-k dominant competitors and recommendations for improving a given web-site; and, FIG. 6 shows an example simulator output showing recommendations for improving the findability of content in one embodiment of the present invention.

DETAILED DESCRIPTION OF PREFERRED EMBODIMENTS

The present invention is directed to a methodology, system and computer program product for improving document (e.g., web-page) and web-site findability. A document includes textual content. For example, a set of textual documents such as web pages belonging to a specific web site (Intranet or Internet web site(s)). Content in this case is referring to the textual content of these pages, and to the anchor text of hyper-links pointing to these pages. Textual content may also be retrieved in the form of a single document or related documents from a database, or other repository.

A user finds relevant documents by using query terms which are submitted to a search engine. It is therefore important to ensure that documents are found by the most appropriate query terms.

Figure 1:
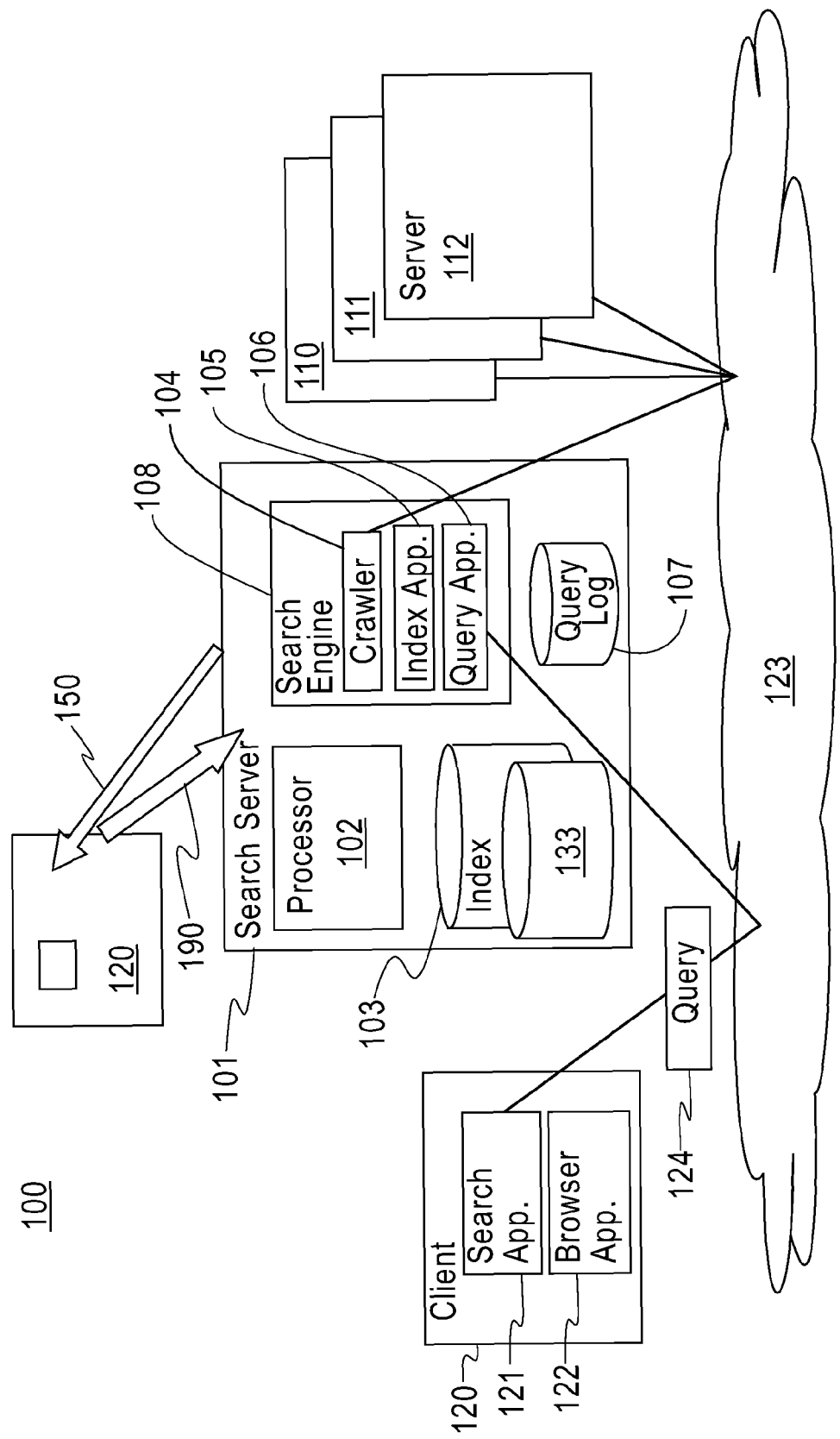
FIG. 1 is a block diagram of a search system in which the present invention may be used.

Referring to FIG. 1, an example embodiment of a search engine system 100 as known in the art is shown. A server system 101 is provided generally including a central processing unit (CPU) 102, with an operating system, and a database 103. A server system 101 provides a search engine 108 including: a crawler application 104 for gathering information from servers 110, 111, 112 via a network 123; an application 105 for creating an index or catalogue of the gathered information in the database 103; and a search query application 106.

The index stored in the database 103 references URLs (Uniform Resource Locator) of documents in the servers 110, 111, 112 with information extracted from the documents.

The search query application 106 receives a query request 124 from a search application 121 of a client 120 via the network 123, compares it to the entries in the index stored in the database 103 and returns the results in HTML pages. When the client 120 selects a link to a document, the client's browser application 122 is routed straight to the server 110, 111, 112 which hosts the document.

The search query application 106 keeps a query log 107 of the search queries received from clients using the search engine 103. In conventional methods, the query log 107 is often used to analyze users' queries to provide search engine optimisation of a document.

There are many search engines on the Internet each with its own method of operating to located web pages within the web. Internet technology is also used to create private corporate networks call Intranets. Intranet networks and resources are not available publicly on the Internet and are separated from the rest of the Internet by a firewall which prohibits unauthorised access to the intranet. Intranets also have search engines which search within the limits of the intranet. In addition, search engines are provided in individual web sites, for example, of large corporations. A search engine is used to index and retrieve the content of only the web site to which it relates and associated databases and other resources.

As further shown in FIG. 1, according to the invention, is a simulator device 120 comprising computer-implemented processing instructions and application programming interfaces operating under control of the server system 101 or like computer device for generating a list of recommendations for improving the findability of a document.

In the embodiment depicted in FIG. 1, the simulator 120 may be integral with the server device, co-located in an area with or, or remote from, but otherwise operable in conjunction with a search engine 108 that may comprise any private or publicly available search tool designed to search the World Wide Web or network 123 for web-pages, images and other types of information. Internet or Intranet search engines gather information by accessing web sites and indexing their content, e.g., by "crawling". Google™, for example, is a well-known search engine, but other similar types that initiates a search and provides links to information matching the input are include, e.g., Yahoo!™, Ask.com, Wikia, etc.).

More particularly, the inputs 150 to the simulator 120 are, in one embodiment: a list of web pages or a web-site containing several pages which is referred to herein as the "content". The simulator provides an interface to the search engine in a manner such that the simulator may provide the following functionality: 1) run a query on the search engine and retrieve the returned results 190; 2) obtain a list of indexing terms for a specific page, as extracted by the parsing devices provided with the search-engine (parsers). The list of terms is checked to determine if they are identical to the list of terms that were actually used for indexing that page in order to verify that the terms used to represent the page within the search index are indeed the terms who represent the current content of page on the Web. For example, it might be a case that a page which has been modified on the Web, has not been modified within the search index. By comparing the terms extracted from the page and the terms that are used to index that page, a modified site that has not been updated within the index may be identified.

The list might include terms extracted from the page content, from the page meta-data, and from any other available sources used by the search engine such as anchor text data, user-tags as extracted from a collaborative bookmarks system, etc., and the terms should be identical to the list of terms that were actually used for indexing that page; and, 3) obtain any "other" features of the page used by the search engine ranking function to identify any of the page features that are used by the search engine to index the pages. For example, the time of indexing, or the number of in-links of a page (and the number of pages who link to the site) is used by most search engine as an important feature for scoring. The simulator uses the feature extraction tools of the search engine to extract all features used to index the page, in order to extract those feature from the input pages to be analyzed.

Once these inputs are provided to the simulator 120, the simulator executes programmed instructions to identify one or more important features of the site pages related to its findability. This set of features includes, but is not limited to, finding the following:

1) the date of last page update in the index, number of page in-links, its title and other relevant meta-data user tags, and others.
2) the most important concepts (terms) in the content;
3) a list of "top-k dominant competitors". A top-k dominant competitor is defined as any page in the domain (i.e., the collection of documents indexed by the search engine), not belonging to the given site, that is ranked higher than all the site pages for at least k important terms.

The simulator 120 will then generate output results 19 including a list of recommendations for improving the findability of the content. This list will include recommendations for: modifying the format of the content (modifying titles, emphasis, etc), adding keywords, adding in-links (simulating what will happen if more external pages will link to your site), and, modifying content. The list may be ranked according to effectiveness, that is, the highest ranked recommendation is the one which will have the greatest effect on findability.

An example of a list of recommendations provided by the simulator 120 of the present invention for a given web-site is provided with reference to FIG. 6.

The user will then be able to apply one or more recommendations, apply any other modification the user might consider to be useful, see the effect on the web page, and the effect on ranking of the list of important concepts. Note that each modification will be applied by the simulator to simulate the search behavior of the search engine as if the original site would have been replaced by the modified one.

The search engine will simulate the replacements of the current pages in its indices and other data structures with the modified ones and re-evaluate the site findability. The simulation of page replacements are performed on a mirror index of the search engine where page modifications immediately affect the site findability. When the user is satisfied with the findability results the simulator will save the modified pages for upload to the search engine.

The simulator can be used as stand-alone or integrated with an HTML editor or like editing device to ease the modifications of the Web site and enable textual content and any scripts or functionality to be modified or updated.

Figure 3:
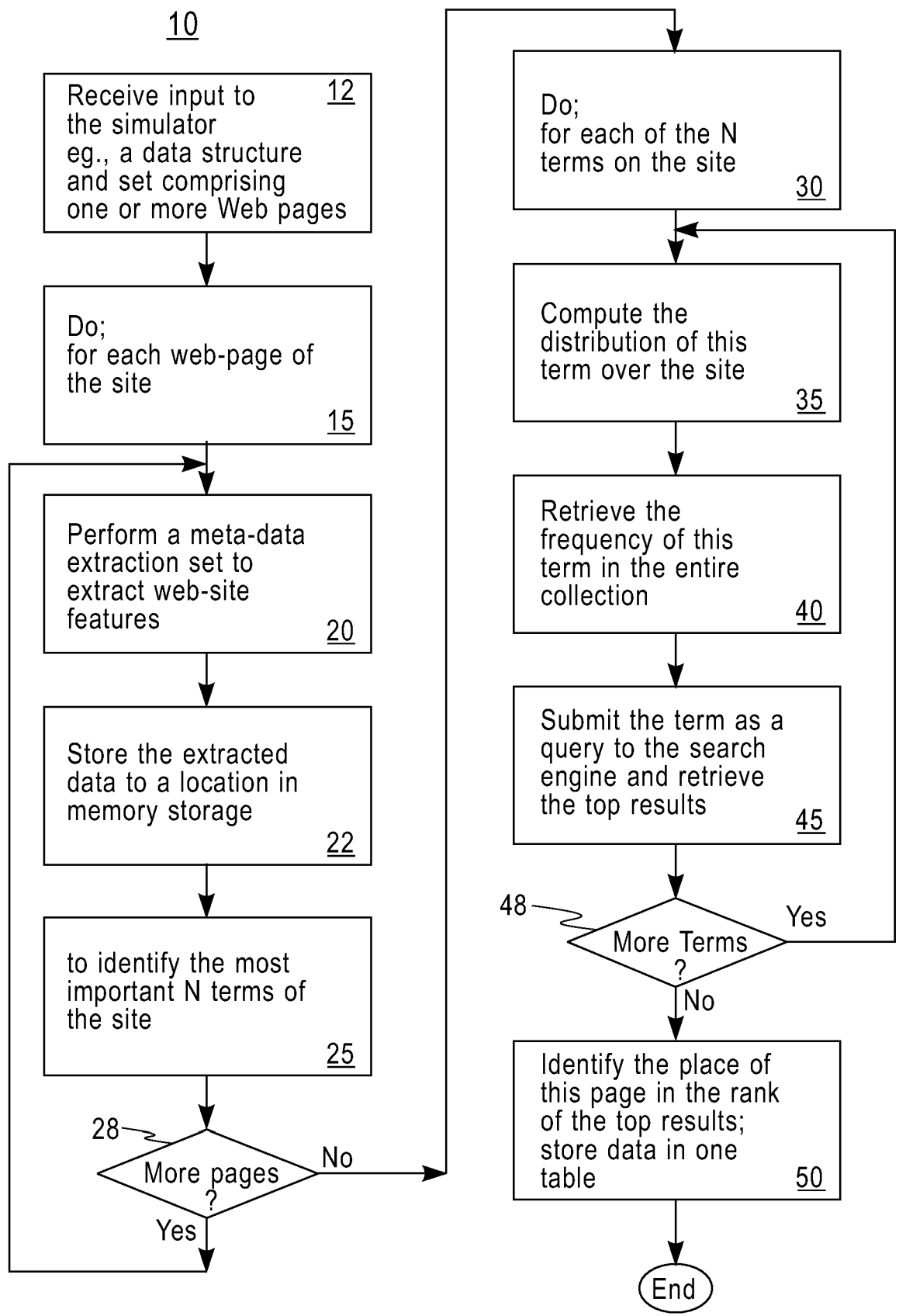
FIG. 3 is a flow chart depicting simulator operations in one embodiment of the present invention.

A detailed description of the processes performed by the simulator 120 is now described with respect to the flow chart of FIG. 3 depicting simulator operations 10. The simulator works as follows:

A data-structure representing a web-site input to the simulator at step 12. This input may include, for example, a data structure and set comprising textual content of a given site's Web pag(e). The simulator, in response, executes a process including the following functionality: as shown in the loop beginning at step 15 and ending at step 28, for each web-page of the site, performing, at step 20, a meta-data extraction set to extract a number of in-links, extract a number of out-links, extract a meta-data (page title, page-keywords, last index update date), extract user annotations if exist (tags, comments) etc. Then, at step 22, the simulator provides all the extracted data to a location in memory storage, e.g., in one database table, where the data is organized and stored. FIG. 5A depicts exemplary interface provided of the extracted data at an output page of the findability simulator.

Then, at step 25, the simulator provides an identification step to identify the most important N terms of the site. It is understood that N is a configurable parameter, having, for example, a default value of 10, but not at all limited. Identifying the most important N terms of the site can be performed in several ways. For example, in the way as described in commonly-owned, U.S. patent application Ser. No. 11/461,464 filed Aug. 1, 2006, now U.S. Pat. No. 7,792,830, (of identifying the most important terms in a web-site). This published patent is incorporated by reference as if fully set forth herein. The algorithm includes determining a set of terms from the terms of the document set that minimizes a distance measurement from the given set of documents. The method includes using a greedy algorithm to build the set of terms incrementally, at each stage finding a single word that is closest to the document set. The set of terms is evaluated to assess the ability to find the document set. The set of terms are compared with expected terms to evaluate the ability to find the document set. A measure of the ability to find a document set is provided by computing a distance measure between a document set and an entire collection.

Figure 2:
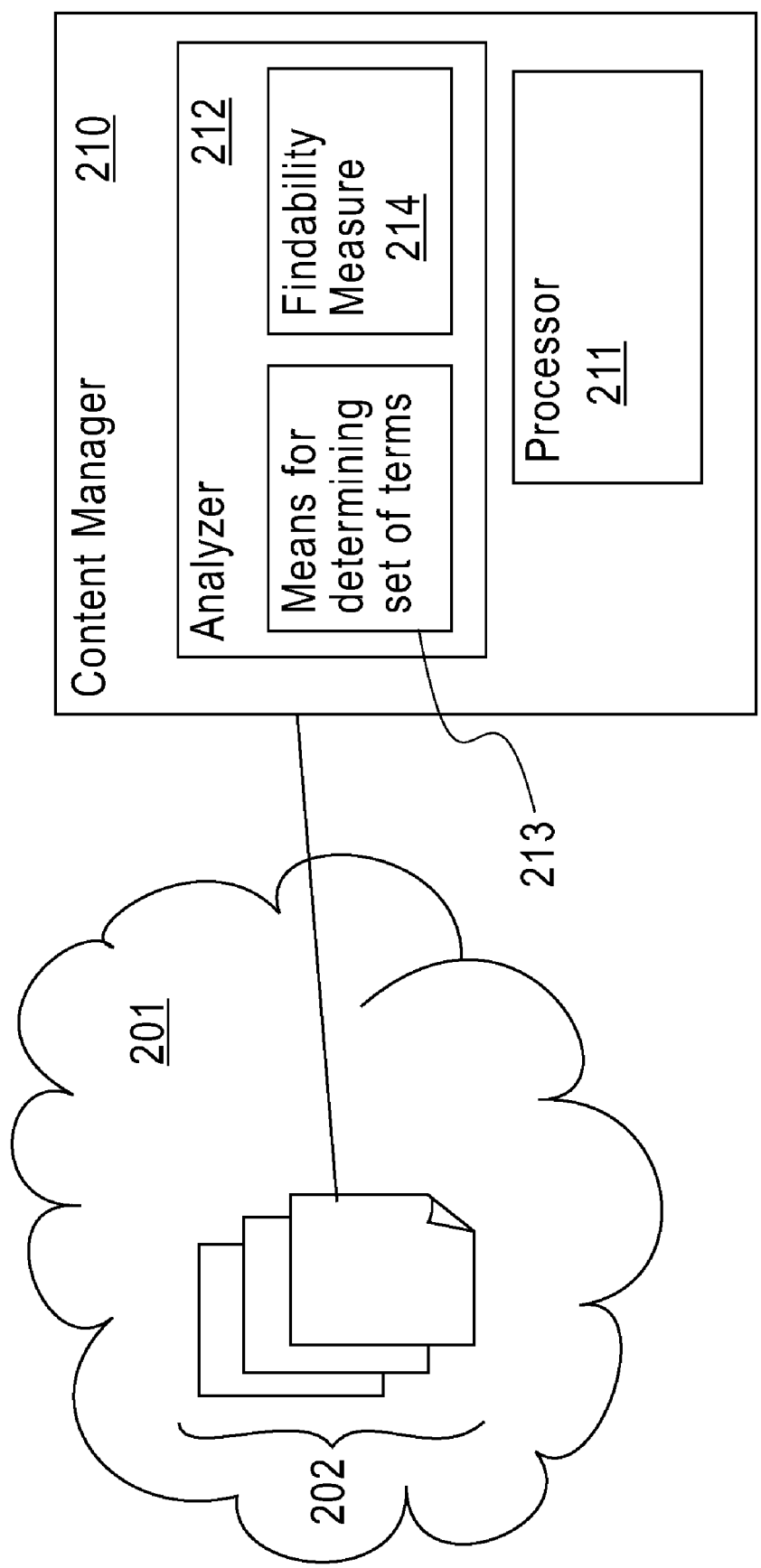
FIG. 2 is a block diagram of a content manager system employed in accordance with the present invention.

Referring to FIG. 2, an entire document collection 201 is shown schematically including a document or a document set 202 to be analyzed. The document or document set 202 may be a web site, an intranet site, a web page, an intranet page, a web domain, an intranet domain, a database document etc. This is referred to herein as a document set 202, although it will be appreciated that the set may include a single document. The document collection 201 may be the entire web, one or more web sites, an intranet, a database, etc. The document collection 201 may be dispersed across a network or within a database, etc. The document set 202 is retrieved from the document collection 201 by users using search queries.

A content manager 210 is shown which provides and/or manages a document set 202. For example, the content manager 210 may manage a web site or an intranet site. The content manager 210 includes a processor 211 and an analyzer 212 for analyzing the findability of the document set 202 from within the document collection 201. The analyzer 212 includes a means for finding a best set of query terms 213 for the document set 202 and a findability measure 214 for the document set 202.

In the context of the invention, document collection or document set including web pages-of a web-site are provided by one or more servers and a content manager is employed in direct communication with a server providing the document set, or may communicate with it via a network. An analyzer may be provided integrally with the simulator a content manager, or may be provided to a content manager as a service over a network as long as the service has a full access to the content manager API (not shown).

The described method analyzes a document set including the following steps: 1. Identification of the best words, word parts (such as prefixes), word collocates (lexical affinities), or phrases in the document set; 2. Assessing how easily typical users will be able to find content in the document set. This is done by invoking a measure of findability for the document set; 3. Suggesting ways in which findability could be improved by optimizing the content against the new findability measure; and, 4. Locating content which is similar to the analyzed content.

The described method is based on a model of query difficulty. The model describes the information retrieval process as a matching of queries to relevant documents, both form an underlying topic. The model shows that query difficulty is derived from five distances induced by the difficulty model: 1. The distance between the query/queries and the entire collection. 2. The distance between queries of the same topic. 3. The distance between relevant documents and the collection. 4. The distance between relevant documents. 5. The distance between the queries and the relevant documents.

The Jensen-Shannon divergence (JSD) is used in one embodiment as described in herein incorporated commonly-owned, U.S. patent application Ser. No. 11/461,464 filed Aug. 1, 2006, now U.S. Pat. No. 7,792,830, to measure the distances between objects (sets of documents and queries). In general, other distance measures could be used.

The distance measured above is, in fact, the separation between the relevant documents and the entire collection. It can be thought of as the signal-to-noise ratio of the topic. In order to analyze findability, the JSD distance of a given document set (for example, a given set of web pages or a web site) is measured from the entire collection.

When a document set is provided, the first step is to find a list of words (word parts, word combinations or phrases) that best describe the document set. The Query Coverage (QC) set is defined as the set of terms that minimizes the JSD distance from the given document set. Finding the QC set, given a document set, is NP-hard (non-deterministic, polynomial-time hard); therefore, a greedy algorithm is used. The algorithm builds the QC set incrementally; at each stage it finds a single word that is the closest (in JSD distance) to the document set. This process repeats, and words are added to QC so as to minimize the JSD distance from the document set (or increase it by the smallest amount).

Content managers can evaluate this list and verify that the QC set indeed contains words that users are likely to submit to a search engine when trying to locate their document set. If not, i.e. when the QC set does not contain expected words, this is a good indication of problematic findability.

After the list of best words is formed, a sequence of queries is created, with the first best word, the first two best words and so on, up to the first N best words. The sequence of queries is executed (by any search engine) and the average precision (AP) for each query is computed. The AP for a query is computed by considering the document set as the target set. The resulting curve of AP against the number of terms is then analyzed. This curve shows the findability behavior of a document set.

Taking the example in which a document set is a web site, for one type of site, the maximal AP is achieved by the first word and additional words do not greatly improve it. Other sites, on the other hand, show a dramatic increase with the addition of words. It can be shown that there are three typical findability behaviors: 1. Sites which are easily findable using the first two or three best terms, for example; 2. Sites which are not findable even when using very long queries based on the QC set; and 3. Sites which require long (5-10) best word queries in order to be located.

By reporting the type the specific site belongs to, site managers can appreciate the findability of their site.

Continuing with the flow diagram of FIG. 3, an important terms analysis is performed with functionality: as shown in an inner loop beginning at step 30 and ending at step 48, for each of the important terms found in the site, the distribution of this term is computed over the site (i.e., it is determined at step 35, the total number of occurrences in the site, and the number of occurrences of this term in each of the pages). Then, at step 40, the frequency of this term in the entire collection is retrieved. (Term frequency distribution over the site is provided mostly as an evidence to the significance of the term.

In addition, the frequency distribution can be used to identity why another site dominates the analyzed site for a specific term (e.g., when the term is more frequent in the other site). Then, at step 45, the term is then submitted as a query to the search engine in order to retrieve the top results. The loop then determines at step 48 whether there are any more terms in the current website to process in which case the process returns to step 35. Otherwise, the process returns to the next step 50 of identifying, based on the query results, the place of the current web page in the rank of the top results. After determining the current page's ranking based on the term results analysis, returns to provide the simulator output results which includes the ranking as determined for each Web-page of the site. The resulting rank data may be provided for storage to and retrieval from a database table.

FIG. 5A illustrates a table 300 of an example output page of the findability simulator 120 of FIG. 1 which indicates, in an example embodiment, the following analysis information for each row corresponding to each identified page at a web-site: the URL of the web-page of the subject web-site including any identifier in col. 302; the number of in-links to the page in col. 304 and a number of out-links to the page in col. 306; a date in which the index was last updated in col. 308; an indication whether the indexed version is up to date at col. 310; a title of the web page in col. 313; a listing of the keywords in col. 315; and, the presence of any dogear tags in col. 318.

FIG. 5B depicts a table 350 of an example output page of the findability simulator 120 of FIG. 1 which indicates, in an example embodiment, a list of the most important terms 375 dominating three example webpages, labeled A, B and C, of a given web-site, and, for example, their frequency 380 in the entire collection (web-site).

The above-described principles of the invention can be applied to obtain information about an entity's Dominant Competitors by performing a top-k dominant competitor analysis for determining any web page in the domain, not belonging to the given site, that is ranked higher than all the site pages for at least k important terms.

FIG. 5C depicts an example user interface 390 of the findability simulator wherein, for a selected competitor web-page 396, in response to selection of "analyze" button 395, a findability analysis may be conducted from which information may be determined the top-k dominant competitors and recommendations for improving a given web-site.

Figure 4:
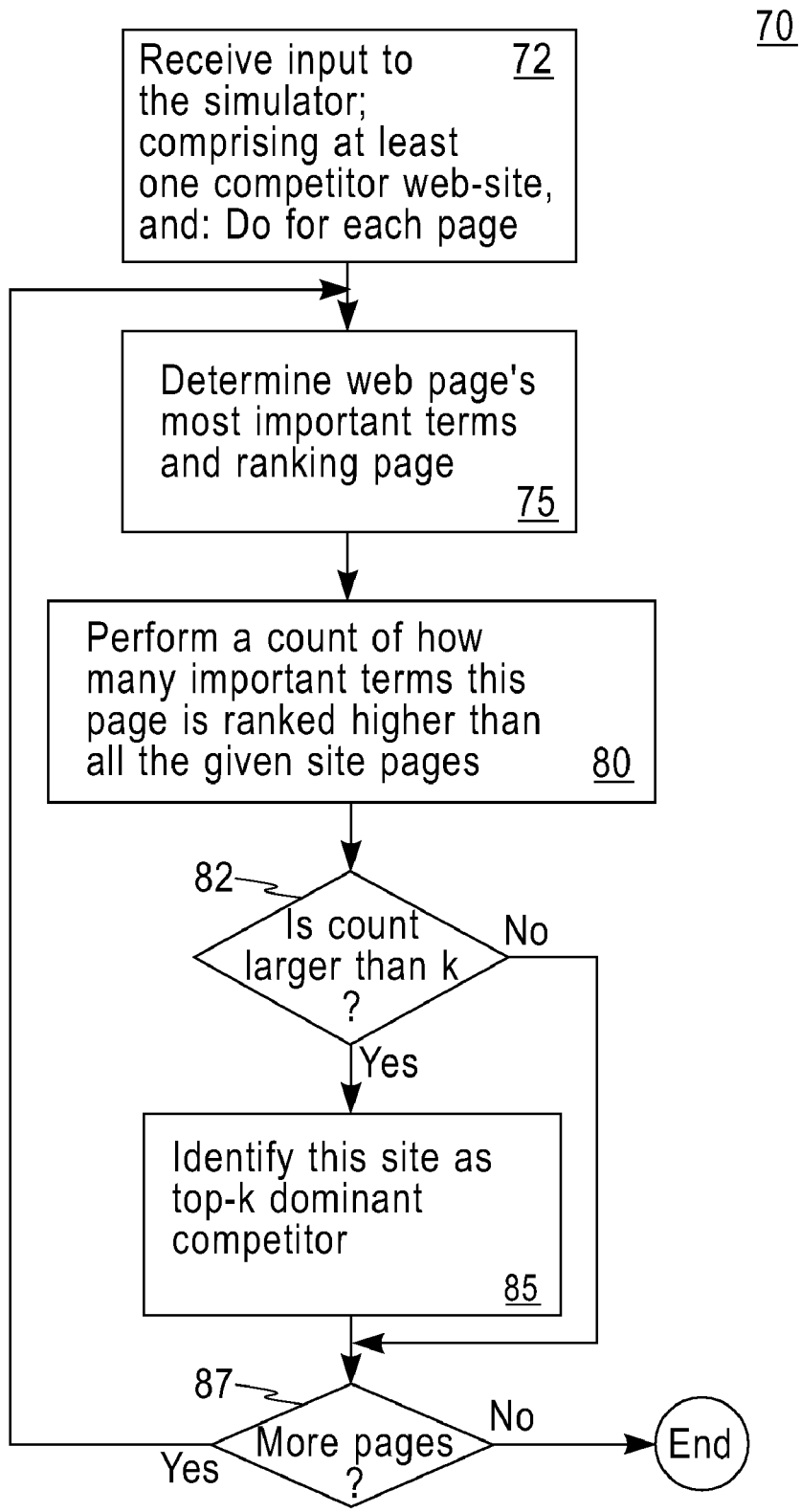
FIG. 4 is a flow chart depicting simulator operations for determining top-k dominant competitor in one embodiment of the present invention.

In this top-k dominant competitor analysis, for each non given web-site page belonging to the sets of results retrieved, a count is performed for how many important terms a non given web-site page is ranked higher than all the given site pages. If this number is larger than k, this page is reported as a top-k dominant competitor (and the list of terms for which it dominants). In one embodiment, the top-k competitors may be found where k is a configurable integer greater than 1 (e.g., having a default value of 3). As shown in FIG. 4, there is performed the top-k competitor analysis steps 70 including, as shown at step 72, receiving or inputting documents (data structure and document set) comprising an entity's competitor (non-given) web sites (web pages) to the simulator. As shown at step 75, the simulator analyzes the competitor site's data set utilizing the steps described herein with respect to FIG. 3, and determines a ranking of web pages. Thus, in accordance with this analysis, the most important terms are determined for each site (comprising at least one competitor web-site, and any page(s) in the domain not belonging to the given site), and its ranking is determined. Then, a determination is made as to whether web page, not belonging to the given site, ranks higher than all the site pages for at least k important terms. In one embodiment, as shown in FIG. 4, at step 80, for each non-site page belonging to the sets of results retrieved there is performed a count for how many important terms this page is ranked higher than all the site pages. Then, at step 82, a determination is made as to whether the count (value) is larger than k. Then, as shown at step 85, this web page is reported as a top-k dominant competitor (and a the list of terms for which it dominants). The process then continues to the next step 87 of the loop to determine whether there are any more web pages to process for the competitor's web site in which case the process returns to step 75 and the process repeats; otherwise, if no more web pages of a competitor's web-site are analyzed, the process ends.

The simulator can additionally perform a competitor analysis and competitor comparison function. In this embodiment, all the analysis as described herein with respect to FIGS. 3 and 4 can be performed for any of the competitor web pages (non-given web site). The full analysis is applied for one of the competitor pages. With ranking and top-k dominant information, a comparison of the competitor may be performed to compare the competitor page to one of the site (given) pages. In one embodiment, a table is generated that comprises a storage for any or all meta-data identified (as shown at meta-data extraction steps 20, 22 of FIG. 3) for both pages. Then, the list of important terms dominated by that competitor and their distribution in both pages is provided. Then, the system automatically provides recommendations. In one embodiment, as shown by the table 350 in FIG. 5B, there is depicted an example user interface providing a list of the most important terms 375 dominating three example webpages, labeled A, B and C, of a given web-site, and, for example, their frequency 380 in the entire collection, which may be used to analyze a given or competitor's web-site and other information that can by utilized by the simulator, e.g., to provide recommendations for improving.

A further processing stage may be implemented for automatically utilizing the site findability analysis information, e.g., of FIGS. 5A, 5B obtained from the processing stages described herein with respect to FIGS. 3 and 4, and automatically analyzes the data and make recommendations for improving the given website. Recommendations are provided automatically based on the findabiltiy analysis. Example recommendations, in one embodiment, may include modifying the web-site meta data, to wit: 1) if meta-data does not contain important terms consider to add them; 2) If pages' titles repeat themselves or are too similar to external pages titles, consider modifying them to be more specific; 3) if the number of in-links is low, try to identify external sites that might be interested to link to the website content; 4) if there are important terms who fail to retrieve the website, consider to increase their frequency in the website, etc. FIG. 6 provides for more examples of potential recommendations to emphasize weak points in the given site. In one embodiment, as depicted in FIG. 6, an example recommendations analysis output display 400 is generated that includes recommendations 450. Example recommendations may include, but are not limited to: a Meta-data improvement: e.g., improve page titles to describe the page content if same title for all site-pages; add important terms to the page meta-data if title and keywords do not include important terms; look for extra resources that will be interested to link to your site if meta-data extraction reveals a Low number of in-inks; and, identify the reasons for why site pages have not been updated in the search index for a long time (or even worse—are not indexed at all). In one example, a recommendation 410 may direct the user to the interface of FIG. 5C to review the dominant competitors list and, for a selected competitor website 396, click on the analyze button 395 of FIG. 5C to initiate findability of the competitor web-site.

Advantageously, in accordance with the principles of the invention, important terms can be analyzed to determine whether the important terms indeed express the main concepts a given web site is focused on.

Thus, in accordance with the principles of the invention, dominant competitors can be determined and analyzed such that, via the analysis output display 400 of FIG. 6, to determine the differences between a given site's page(s) and the competitors, which differences may be suitably emphasized or flagged for a user, via a client device 120 (FIG. 1). Such determination is valuable as the user may learn the reasons that cause their competitors to dominant a given site's page(s). It is understood that the simulator analysis is automatic but decisions are made by the content owner. The simulator identifies top-k competitors, important terms which fail to retrieve the site, problematic meta-data, etc., however, the simulator does not make any change in the site content, this is left to the content owner.

Further, via an interactive process, the simulator enables the user to modify his/her web site and simulate how these modifications affect its findability. As mentioned herein, as shown in FIG. 1, the search engine holds a separate mirror index 133 where the site modifications are handled. After modifications has been applied the findability analysis is invoked over the modified site. After the user is satisfied with his/her modifications and is satisfied with the new findability of the site, the new modified site will be re-indexed by the search engine, i.e., the user will be able then to replace his/her current site in the repository with the modified one.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A computer-implemented method for improving findability of a web-site's content, the method comprising:
    receiving a document set representing said web-site's web page(s);
    for each web-page, performing a meta-data extraction to obtain one or more features of each web-page related to findability of each web-page;
    determining one or more important terms associated with said web-site based upon said features;
    for each important term found for said web-site, implementing, via a search engine, a search query using said term and retrieving the returned results of at least one web page having said term;
    identifying, based on the query results, the place of each web-page of said web-site in the rank of the returned results; and
    providing at least one recommendation for improving said web site based upon said results ranking;
    wherein said at least one recommendation is based on a ranking, of at least one web-page in a domain not belonging to said web-site, that is ranked higher than all of said web-site's web page(s) for at least one important term; and
    wherein said at least one recommendation is directed to improving said findability of said web-site's content.

2. The computer-implemented method as claimed in claim 1, wherein said features of each web-page related to its findability comprise: a date of last page update in an index maintained by said search engine, a number of page in-links, its title and relevant meta-data user tags.

3. The computer-implemented method as claimed in claim 1, further comprising, for each important term found:
    important term analysis comprising determining a frequency of said important term in the entire document set; and
    if the frequency is greater than a predetermined threshold, submitting said important term to said search engine to obtain said returned results.

4. The computer-implemented method as claimed in claim 1, wherein said one or more important terms include the most important concepts in the content, said determining web-site's one or more important terms including: determining a set of terms from the terms of said document set that minimizes a distance measurement from the given set of documents.

5. The computer-implemented method as claimed in claim 1, wherein said metadata extraction includes implementing a parsing device associated with said search-engine.

6. The computer-implemented method as claimed in claim 1, wherein said document set includes one or more of: a web site, an intranet site, a web page, an intranet page, a web domain, an intranet domain, a database document, a single document.

7. The computer-implemented method as claimed in claim 2, wherein said meta-data extraction includes extracting one or more of: a number of in-links, a number of out-links, a meta-data, user annotations.

8. The computer-implemented method as claimed in claim 7, wherein said meta-data includes a site's page title, page-keywords, last index update date.

9. The computer-implemented method as claimed in claim 1, wherein said important terms determination comprises: computing, for each important term associated with said web-site, a distribution of said important term over said web-site, said computing comprising:
    determining a total number of occurrences of said important term associated with said web-site, and
    determining the number of occurrences of said important term associated with each web- page.

10. The computer-implemented method as claimed in claim 9, further comprising performing a top-k dominant competitor analysis by determining any web- page in a domain, not belonging to said web-site, that is ranked higher than all said web-pages belonging to said web-site for at least k important terms, where k is an integer.

11. The computer-implemented method as claimed in claim 10, wherein said top-k dominant competitor analysis comprises:
    receiving a second document set representing a second web-site's page(s);
    determining a ranking of said second web-site based on said second web-site's important terms from said features;
    performing a count of how many important terms this page is ranked higher than all said web-site pages;
    determining whether the count is greater than a threshold number k; and
    if said count is greater than said threshold k, identifying said second web-site as a top-k dominant competitor.

12. The computer-implemented method as claimed in claim 10, further comprising:
    determining the differences between said web-site's page(s) and said second web-site's page(s); and
    informing a user of said differences, wherein said differences can be used to modify said web-site's page(s).

13. A system for improving findability of a web-site's content, the system comprising:
    a server device for receiving a document set representing said web-site's page(s);
    a simulator device operable for receiving said document set and for analyzing each web- page of said document set to determine one or more important terms associated with said web- site;
    a search engine for implementing, for each important term found for said web-site, a search query using said term and retrieving the returned results of web-pages having said term, said search engine further identifying, based on the query results, a ranking of each web-page of said web-site in a list of the returned results; and
    said simulator device generating an interface to provide at least one recommendation directed to improving said web-site based upon said results ranking;
    wherein said at least one recommendation is based on a ranking, of at least one web-page in a domain not belonging to said web-site, that is ranked higher than all of said web-site's web page(s) for at least one important term; and
    wherein said at least one recommendation is directed to improving said findability of said web-site's content.

14. The system as claimed in claim 13, wherein said simulator device comprises:
    means for performing, for each web-page, a meta-data extraction to obtain features of site web-page related to its findability, said means for performing determining from said features said web-site's one or more important terms.

15. The system as claimed in claim 14, wherein said one or more important terms include the most important concepts in said web-site's content, said means for performing further determining, for each web-page, a set of terms from the terms of said document set that minimizes a distance measurement from said document set.

16. The system as claimed in claim 15, wherein said simulator device comprises:
    means for performing a top-k dominant competitor analysis, said means for performing a top-k dominant competitor analysis determining any web-page in a domain not belonging to said web-site, that is ranked higher than all said web-site pages belonging to said web-site for at least k important terms, where k is an integer.

17. The system as claimed in claim 16, wherein said means for performing said top-k dominant competitor analysis further comprises:
    means for receiving a second document set representing a second web-site's page(s);
    means for determining a ranking of said second web-site based on said second site's important terms from said features; and
    means for performing a count of how many of said second web-site's important terms are ranked higher than all said web-site pages, determining whether the count is greater than a threshold number k; and, if said count is greater than said threshold k, identifying said second web-site as said top-k dominant competitor.

18. The system as claimed in claim 16, further comprising:
    an editing device for enabling user modifications to content of said web-site; and
    a storage device for storing a mirror index of said modified web-site content.

19. The system as claimed in claim 18, further comprising:
    a storage device for maintaining a mirror index of said web-site where the web-site content modifications are handled, and, after modifications are applied,
    said simulator device simulates said modified web-site's findability by performing a findability analysis over said modified site to determine a new findability of said web-site; and, determines from said simulating whether said modified web-site's findability has improved, and, if said modified web-site's findability has improved, said search engine re-indexing said modified web-site.

20. A computer-implemented method for improving findability of a web-site's content, the method comprising:
    receiving, at a simulator, a document set representing a web-site's page(s);

analyzing, by said simulator, each web-page of said document set to determine one or more important terms associated with said web-site;

searching, via a search engine, for other web pages by using web-site's one or more important terms and, retrieving the returned results of other web pages having said one or more important term, said search engine further identifying, based on the query results, the rank of each web-page of said web-site in a list of the returned results; and automatically generating an interface to provide at least one recommendation for a user to improve said web-site based upon said results ranking;

wherein said at least one recommendation is based on a ranking, of at least one web-page in a domain not belonging to said web-site, that is ranked higher than all of said web-site's web page(s) for at least one important term; and wherein said at least one recommendation is directed to improving said findability of said web-site's content.

21. The method as claimed in claim 20, wherein said one or more important terms include the most important concepts in said web-site's content, said determining the web-site's one or more important terms including: determining a set of terms from the terms of said document set that minimizes a distance measurement from said document set.

22. The method as claimed in claim 21, further including: performing a top-k dominant competitor analysis by determining any web-page in the domain, not belonging to said web-site, that is ranked higher than all said web-site for at least k important terms, where k is an integer.

23. The method as claimed in claim 22, wherein said top-k dominant competitor analysis comprises:
receiving a second document set representing a second web-site's page(s);
determining a ranking of said second web-site based on said second web-site's important terms from said features; p1 performing a count of how many important terms this page is ranked higher than all said web-site pages;
determining whether the count is greater than a threshold number k; and
if said count is greater than said threshold k, identifying said second web-site as said top-k dominant competitor.

24. The method as claimed in claim 22, further comprising:
modifying said web-site's content based on said ranked results;
simulating said modified web-site's findability; and
determining from said simulating whether said modified web-site's findability has improved.

25. The method as claimed in claim 24, further comprising:
maintaining a mirror index of said web-site where said web-site content modifications are handled after modifications are applied, performing a findability analysis over the modified web-site to determine a new findability of said site; and
re-indexing by said search engine, said modified web-site.

26. A program storage device readable by a machine, tangibly embodying a program of instructions executable by the machine to perform method steps for improving findability of a web-site's content, said method steps including the steps of:
receiving, at a simulator, a document set representing said web-site's page(s);
analyzing, by said simulator, each web-page of said document set to determine one or more important terms associated with said web-site;
searching, via a search engine, for other web pages by using the site's one or more important terms and retrieving the returned results of said other web pages having said one or more important terms, said search engine further identifying, based on the query results, the rank of each web-page of said web-site in a list of the returned results; and
automatically generating an interface to provide at least one recommendation for a user to improve said web-site based upon said results ranking;
wherein said at least one recommendation is based on a ranking, of at least one web-page in a domain not belonging to said web-site, that is ranked higher than all of said web-site's web page(s) for at least one important term; and
wherein said at least one recommendation is directed to improving said findability of said web-site's content.

27. A method of deploying a computer program product for improving findability of a web-site's content, wherein, when executed, the computer program performs the steps of:
receiving, at a simulator, a document set representing said web-site's page(s);
analyzing, by said simulator, each web-page of said document set to determine one or more important terms associated with said web-site;
searching, via a search engine, for other web pages by using said web-site's one or more important terms and, retrieving the returned results of said other web pages having said one or more important terms, said search engine further identifying, based on the query results, the rank of each web-page of said web-site in a list of the returned results; and
automatically generating an interface to provide at least one recommendation for a user to improve said web-site based upon said results ranking;
wherein said at least one recommendation is based on a ranking, of at least one web-page in a domain not belonging to said web-site, that is ranked higher than all of said web-site's web page(s) for at least one important term; and
wherein said at least one recommendation is directed to improving said findability of said web-site's content.

* * * * *